(12) United States Patent
Blasko

(10) Patent No.: US 10,594,227 B1
(45) Date of Patent: Mar. 17, 2020

(54) MATRIX CONVERTER OPERATING IN CURRENT CONTROL MODE USING FEED FORWARD SIGNALS

(71) Applicant: Hamilton Sundstrand Corporation, Charlotte, NC (US)

(72) Inventor: Vladimir Blasko, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/362,533

(22) Filed: Mar. 22, 2019

(51) Int. Cl.
H02M 1/12 (2006.01)
H02M 5/297 (2006.01)
H02M 5/27 (2006.01)

(52) U.S. Cl.
CPC ............ H02M 5/297 (2013.01); H02M 5/271 (2013.01)

(58) Field of Classification Search
CPC ........ H02M 5/297; H02M 5/271; H02M 7/49; H02P 27/14; H02J 3/01
USPC .................................. 363/34–41, 79, 80, 89
See application file for complete search history.

(56) References Cited

U.S. PATENT DOCUMENTS

| 5,355,025 | A | * | 10/1994 | Moran | G05F 1/70 307/105 |
|---|---|---|---|---|---|
| 7,869,236 | B2 | | 1/2011 | Mohan et al. | |
| 8,599,577 | B2 | | 12/2013 | Kajouke et al. | |
| 10,320,306 | B1 | * | 6/2019 | Blasko | H02M 5/297 |
| 2009/0096518 | A1 | * | 4/2009 | Crane | H02M 7/219 327/587 |
| 2011/0199032 | A1 | * | 8/2011 | Ueda | H02M 5/297 318/430 |
| 2016/0226368 | A1 | * | 8/2016 | Al-Hokayem | H02M 1/126 |

* cited by examiner

*Primary Examiner* — Rajnikant B Patel
(74) *Attorney, Agent, or Firm* — Locke Lord LLP; Scott D. Wofsy; Judy R. Naamat

(57) ABSTRACT

A matrix converter system having a current control mode operation is provided. The system includes a matrix converter having a switching matrix. The matrix converter is coupled at its low-voltage side to a generator and at its output load side to a load. A controller having a pulse width modulation (PWM) control circuit is configured to control the matrix converter via its switching matrix to increase energy within the internal inductances of the generator when the switching matrix causes a short circuit. A feed forward calculator is configured to calculate a feed forward output phase angle. The feed forward output phase angle is an estimation of an angle between an output current vector and an output voltage vector that represent feedback signals of current and voltage output by the matrix converter. The angular position of the voltage output vector is adjusted as a function of the feed forward output phase angle to align angular position or phase angle of the voltage output vector that represents the voltage output with a selected angular position or phase angle.

23 Claims, 12 Drawing Sheets

MATRIX CONVERTER OPERATING IN CURRENT CONTROL MODE USING FEED FORWARD SIGNALS

STATEMENT REGARDING FEDERALLY SPONSORED RESEARCH OR DEVELOPMENT

This invention was made with government support under contract number DE-AR00000891, under the ARPA-E FOA Circuits Program, titled Power Conversion Through Novel Current Source Matrix Converter, awarded by the U.S. Department of Energy, April 2018. The government has certain rights in the invention.

BACKGROUND

1. Field of the Disclosure

The present disclosure relates to a matrix converter, and more particularly, to a matrix converter operating in current control mode using feed forward signals.

2. Description of Related Art

Matrix converters are generally used as alternating current (AC)-to-AC converters that receive a multiphase input and produce a multiphase output. Traditional matrix converters operate in voltage control mode (VCM) such that the output voltage is controlled directly based upon the input voltage. In systems that utilize VCM, input inductor-capacitor (LC) circuits are implemented at the input of the matrix converter. The input LC circuit generally includes capacitors connected between each phase of the input. These capacitors create low impedance paths between phases and thus, the matrix converter cannot be controlled to provide short circuits between input phase lines without risking damage to the switching elements. Since the matrix converter cannot create output voltages higher than the line-to-line input voltages, the matrix converter's ability to provide output voltage without distortion is limited. Specifically, the matrix converter is not able to provide an output voltage that is greater than 86.6% of the input voltage without distortion.

While conventional methods and systems have generally been considered satisfactory for their intended purpose, there is still a need in the art for a matrix converter that can operate safely regardless of the output voltage level.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a matrix converter system having a current control mode operation. The system includes a matrix converter having a switching matrix. The matrix converter is coupled at its low-voltage side to a generator and at its output load side to a load. A controller having a pulse width modulation (PWM) controller is configured to control the matrix converter via its switching matrix to increase energy within internal inductances of the generator when the switching matrix causes a short circuit. A feed forward calculator is configured to calculate a feed forward output phase angle, the feed forward output phase angle being an estimation of an angle between current and voltage output by the matrix converter. The angular position of the voltage output by the matrix converter is adjusted as a function of the feed forward output phase angle output voltage with desired phase angle or position.

In embodiments, the feed forward calculator can be further configured to calculate feed forward values of active and reactive currents with respect to back electromotive frequency (EMF) of the generator. The feed forward values of the active and reactive current can be used to adjust currents that affect the controller to minimize the possibility of saturation of the PWM controller.

In embodiments, calculation of the feed forward active and reactive currents at the position with respect to the back EMF of the generator can be a function of magnitude and phase angle position of an EMF vector that represents the back EMF of the generator.

In embodiments, the feed forward calculator is further configured to apply filter to generate the feed forward active and reactive currents.

In embodiments, the system can include a startup generator configured to provide an amount of startup reactive current during a startup phase of the generator. The control circuit can be configured to receive the startup reactive current and provide an amount of voltage as a function of the startup reactive current to the controller during the startup phase, wherein the amount of voltage can be sufficient to avoid saturation of the PWM controller.

In embodiments, the startup reactive current can be maintained for a first interval of time and can be ramped down to about zero over a second interval of time interval.

In embodiments, the system further can include a plurality of output capacitors connected to phases of the current output by the matrix converter. The controller can be further configured to control the matrix converter to increase the energy in the internal inductance of the generator, wherein the increase in energy can be sufficient to cause current from the generator to charge the output capacitors.

In embodiments, the feed forward output phase angle is provided to a unity current reference vector function that implements space-vector control to generate a unity reference current vector having a position defined by the feed forward output phase angle to adjust the angular position of the voltage output by the matrix converter.

In embodiments, the feed forward calculator is further configured to apply a filter to generate the feed forward output phase angle.

In another aspect, a method of controlling operation of a matrix converter operating in a current control mode operation is provided. The matrix converter is coupled at its input low-voltage side to a generator. At its output load side, the matrix converter is connected to a load. The method includes controlling pulse width modulation (PWM) to control the matrix converter to increase energy within internal inductances of the generator when a short circuit occurs. The method further includes calculating a feed forward output phase angle. The feed forward output phase angle is an estimation of an angle between an output current vector and an output voltage vector that represent feedback signals of current and voltage output by the matrix converter. The method further includes adjusting an angular position of the voltage output by the matrix converter as a function of the feed forward output phase angle. The adjusting of the angular position of the voltage output is performed in order to align an output voltage vector that represents the voltage output with a selected position.

In embodiments, the method can further include calculating feed forward values of active current and the reactive current with respect to back EMF of the generator. The feed forward values of the active and reactive current from the generator can be used to adjust currents that affect control of the matrix converter to minimize the possibility of saturation during PWM control.

In embodiments, calculation of at least one of the feed forward values of the active and reactive current can be a function of back EMF of the generator.

In embodiments, controlling the matrix converter to increase energy within the internal inductances of the generator when a short circuit occurs, wherein the increase in energy can be sufficient to cause current from the generator to charge output capacitors connected to the current output by the matrix converter.

In embodiments, the method further can include providing during a startup phase of the generator an amount of startup reactive current, receiving the startup reactive current, and providing an amount of voltage as a function of the startup reactive current for controlling the matrix converter during the startup phase. The amount of voltage can be sufficient to avoid saturation during PWM control.

In embodiments, the method can further include maintaining the startup reactive current for a first interval of time and ramping down the startup reactive current to about zero over a second interval of time interval.

In accordance with still another aspect of the disclosure, a matrix converter system having a current control mode operation is provided. The system includes a matrix converter having a switching matrix, the matrix converter being coupled at its low-voltage side to a generator and coupled at its output load side to a load. A controller having a pulse width modulation (PWM) controller is configured to control matrix converter via its switching matrix to increase energy within internal inductances of the generator when a short circuit occurs in the switching matrix. A feed forward calculator is configured to calculate feed forward values of active and reactive current. The feed forward values of the active and reactive current are calculated based on power demand at the output of the matrix converter. The feed forward values of the active and reactive current are used to adjust currents that affect input to the controller to minimize the possibility of saturation of the PWM controller.

In embodiments, the multiphase voltage source has controllable back EMF. The system can further include a voltage reference generator configured to receive an input signal that is a function of the feed forward values and a magnitude of reactive current and configured to adjust the back EMF of the generator based at least in part on the input signal.

In embodiments, the voltage reference generator can be configured to receive a target back EMF value, determine a voltage change based on a difference between the input signal and the target back EMF value, and can be further configured to output a voltage reference to the generator. The voltage reference can be based on the voltage change.

In embodiments, determining the voltage change can include applying a current scaling function to the input signal.

In embodiments, calculation of the feed forward values of the active and reactive current is a function of back EMF of the generator In embodiments, the system can further include a plurality of output capacitors connected to phases of the multiphase output, wherein the controller can be further configured to control the matrix converter to generate the energy in the internal inductance of the generator, wherein the increase in energy can be sufficient to cause current from the generator to charge the output capacitors.

In embodiments, the system can further include a startup generator configured to provide an amount of startup reactive current during a startup phase of the generator. The control circuit can be configured to receive the startup reactive current and provide an amount of voltage as a function of the startup reactive current to the controller during the startup phase, the amount of voltage being sufficient to avoid saturation of the PWM controller.

In embodiments, the startup reactive current can be maintained for a first interval of time and can be ramped down to about zero over a second interval of time interval.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
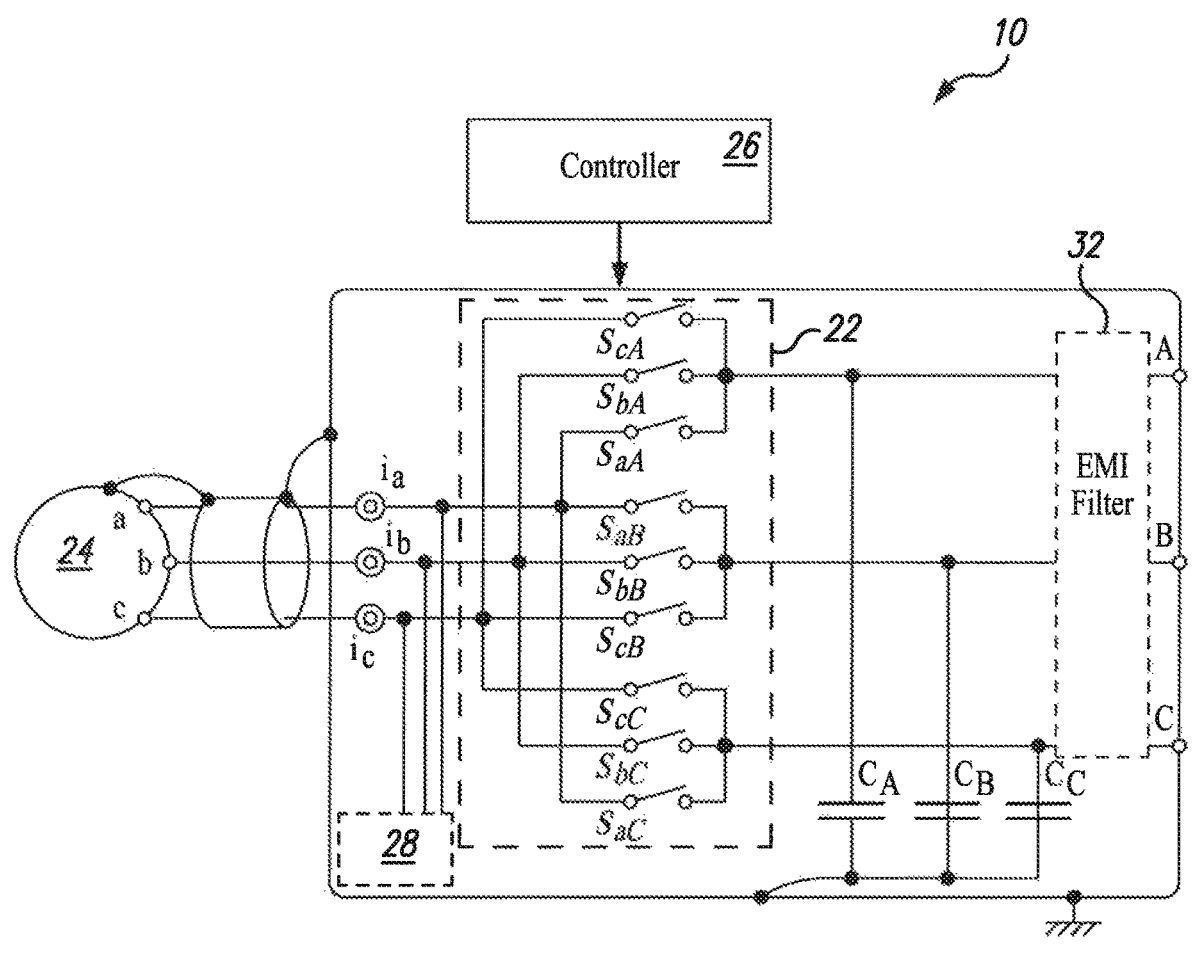
FIG. 1 is a circuit diagram illustrating an example matrix converter system that utilizes a current control mode in accordance with embodiments of the disclosure.

A matrix converter system is disclosed herein that operates from a controllable voltage source in a current control mode (CCM). The matrix converter system includes a matrix converter and a controller configured to control the matrix converter. The controller is configured to calculate a feed forward output phase angle, the feed forward output phase angle being an estimation of an angle between current and voltage output by the matrix converter. The angular position of the voltage output by the matrix converter is adjusted as a function of the feed forward output phase angle output voltage with desired phase angle or position.

In embodiments, the feed forward calculator can be further configured to calculate feed forward values of active and reactive currents with respect to back electromotive frequency (EMF) of the generator. The feed forward values of the active and reactive current can be used to adjust currents that affect the controller to minimize the possibility of saturation of the PWM controller.

In embodiments, the feed forward values of the active and reactive current can be calculated based on power demand at the output of the matrix converter.

The controller can include a startup generator configured to provide an amount of startup reactive current during a startup phase of the generator. The control circuit can be configured to receive the startup reactive current and provide an amount of voltage as a function of the startup reactive current to the controller during the startup phase, the amount of voltage being sufficient to avoid saturation of the PWM controller.

A generator of the matrix converter system can be configured to have controllable back EMF. The controller can include a voltage reference generator configured to receive an input signal that is a function of the feed forward values and a magnitude of reactive current. The voltage reference generator can further be configured to adjust the back EMF of the generator based at least in part on the input signal. In embodiments, the voltage reference generator can be configured to receive a target back EMF value, determines a voltage change based on a difference between the input signal and the target back EMF value, and output a voltage reference to the generator, wherein the voltage reference is based on the voltage change.

The matrix converter does not include an inductor-capacitor (LC) input filter and thus, there are no line-to-line capacitors on the input side of the matrix converter. The input of the matrix converter is connected to receive power from a multiphase generator. The generator includes internal inductances on each phase. Capacitors are connected between each output phase of the matrix converter and ground.

The matrix converter system is capable of operating in a boost mode. When the voltage on the output capacitors is relatively small, switches of a switching matrix of the matrix converter may be operated to short phase lines to increase energy within the internal inductances of the generator when short-circuited. This is possible due to the absence of the LC circuit at the input, which removes the low impedance line-to-line capacitors. Upon generation of energy within the internal inductances of the generator, the switches of the matrix converter may then be controlled to provide current to charge the output capacitors using the generated energy stored in the inductances of the generator. This way, the output capacitors may be charged to a voltage greater than that of the input voltage. Once the voltage on the output capacitors is sufficient, the matrix converter may be controlled normally to control the output to a load.

Reference will now be made to the drawings wherein like reference numerals identify similar structural features or aspects of the subject disclosure. For purposes of explanation and illustration, and not limitation, a block diagram of an exemplary embodiment of a matrix converter system in accordance with the disclosure is shown in FIG. 1 and is designated generally by reference character 10. Methods associated with operations of the matrix converter system 10 in accordance with the disclosure, or aspects thereof, are provided in FIGS. 2-11 as will be described. The systems and methods described herein can be used to provide improved control of a saturation level of pulse width modulation (PWM) for operation of a switch matrix in a matrix converter.

FIG. 1 is a circuit diagram illustrating matrix converter system 10 capable of operation in a current control mode (CCM). Matrix converter system 10 includes matrix converter 22 connected to receive input power from three-phase generator 24 on input phases (a, b, c). Matrix converter 22 include switches $S_{aA}$, $S_aB$, $S_{aC}$, $S_{bA}$, $S_{bB}$, $S_{bC}$, $S_{cA}$, $S_{cB}$, and $S_{cC}$ (hereinafter "$S_{aA}$-$S_{cC}$") that each receive control signals from controller 26. The switches of matrix converter 22 are controlled to convert input power on input phases (a, b, c) to output power on the output phases (A, B, C). Capacitors $C_A$, $C_B$, and $C_C$ are connected to the three respective output phases (A, B, C) of matrix converter 22. Damp circuit 28 (illustrated in further detail in FIG. 2C) is connected to the three phase inputs of matrix converter 22. Generator 24 is connected directly to matrix converter 22 through grounded sheath 30. An electromagnetic interference (EMI) filter 32 can be connected to the output of matrix converter 22 to provide further filtering for system 10. While illustrated as three input phases (a, b, c) and three output phases (A, B, C), any number of input phases and any number of output phases may be connected through matrix converter 22.

Matrix converter system 10 does not include inductors or capacitors at the input of matrix converter 22. By eliminating the capacitors at the input of matrix converter 22, the low impedance paths between phases (a, b, c) on the input side of matrix converter 22 are eliminated. The internal inductances of generator 24 create high impedances and thus, switches $S_{aA}$-$S_{cC}$ may be controlled such that phase-to-phase short circuits are created without the risk of generating damaging overcurrents. This allows system 10 to utilize the internal inductances of generator 24 to generate reactive currents, which can be utilized to charge output capacitors $C_A$, $C_B$, and $C_C$. This allows matrix converter system 10 to operate in a boost mode, generating currents to charge capacitors $C_A$, $C_B$, and $C_C$ even when the voltage on output phases (A, B, C) is relatively small. Thus, system 10 is able to overcome the 86.6% input-to-output voltage limit of matrix converter systems that operate in VCM mode only.

Controller 26 controls matrix converter 22 using a PWM control scheme. Controller 26 can be implemented using hardware, firmware, software, or a combination thereof. Controller 26 observes the current on input phases (a, b, c) and the voltage on output phases (A, B, C) to control matrix converter 22. Controller 26 may select a desired output frequency that is independent of the input frequency. For example, the output may be a three-phase AC output at a frequency greater than, or less than, that of generator 24. Generator 24 may also be a variable frequency generator, such that the frequency is at times greater than the output frequency, and at times less than the output frequency. The output frequency may also be selected to be zero, allowing for matrix converter 22 to generate a DC output from the AC input.

When the system is starting up, or if the voltage on the output phases (A, B, C) becomes relatively small, controller 26 may control matrix converter 22 in a boost mode in order to boost the voltage on output phases (A, B, C). To do this, controller 26 may control select switches $S_{aA}$-Sic) to provide one or more short-circuit paths between input phases (a, b, c). These short-circuit paths rely on the high impedances created by the internal inductance of generator 24. During the short-circuit condition, energy is generated within the internal inductances of generator 24. After a selected time, switches ($S_{aA}$-$S_{cC}$) are controlled to remove the short circuit, and utilize the energy stored in the internal inductances of generator 24 to direct current to charge capacitors $C_A$, $C_B$, and $C_C$, which allows system 10 to create output voltages greater than the input voltages.

In contrast to system 10 that operates in the CCM mode, certain matrix converter systems that operate in a voltage control mode (VCM) are configured to provide an AC-AC voltage conversion that provides three-phase smooth voltage on the output phases. An input inductor-capacitor (LC) circuit is implemented at an input of the system's matrix converter. The input LC circuit generally includes capacitors connected between each phase of the input However, in certain applications, such as motor control applications, a motor can tolerate discontinuous voltages and therefore, motor windings can be directly connected to the output of such a matrix converter.

When operating in VCM, output voltage may be controlled and limited by the available input voltage. Due to the capacitors connected between the input and output phases, there exists a low impedance path between each input phase lines. Because of this, switches of this matrix converter cannot be controlled to provide a short circuit between any of the input phase lines. If a short circuit were created, the low impedance path created by these capacitors would create a large current, risking damage to the switches. Without any energy storage devices present in such a matrix converter to boost voltage during conversion, analysis has shown that operation of the matrix converter in VCM can only achieve, at best, 86.6% of the input voltage at the output.

Figure 2A:
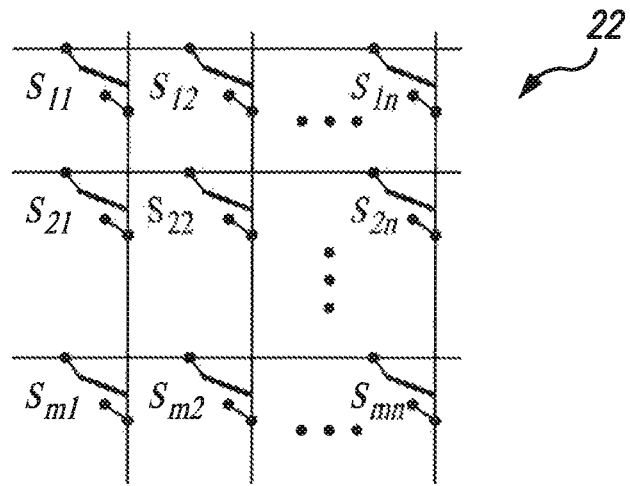
FIGS. 2A-2C are circuit diagrams illustrating an example switch matrix, an example bidirectional switch, and an example damping circuit, respectively, for the matrix converter system of FIG. 1.
Figure 2B:
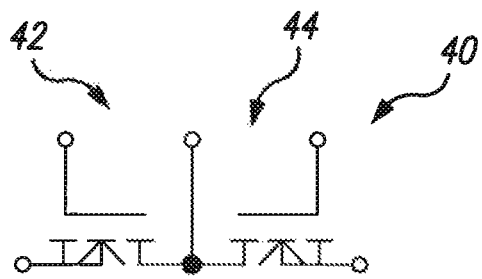

FIGS. 2A-2B are circuit diagrams illustrating a switch matrix for matrix converter 22, a bidirectional switch 40, and damp circuit 28, respectively. FIG. 2A illustrates an embodiment of matrix converter 22. As illustrated in FIG. 2A, matrix converter 22 may have any number (n) of input phases, and any number (m) of output phases. In the embodiment illustrated in FIG. 1, matrix converter has three input phases (n=3) and three output phases (m=3). As illustrated in FIG. 2A, matrix converter system 10 may be configured to generate any number of output phases from any number of input phases.

The matrix converter 22 is described by equations (A) and (B):

$$S^T i_{abc} = i_{ABC}$$
$$v_{abc} = S v_{ABC}$$
(A)

-continued $$D^T i_{abc} = \bar{i}_{ABC}$$
$$\bar{v}_{abc} = D v_{ABC}$$
(B)

where $S^T$ is a transposed switching matrix S that represents a switching value applied to each switch of the switch matrix of the matrix converter 22. When a high sampling rate and short sampling time $T_s$ is used, it can be assumed that input and output voltages and currents have negligible small changes and can be considered constant, such that switching matrix S can be replaced with duty cycle matrix D, as shown in Equations (A) and (B), where $\bar{v}_{abc}$ and $\bar{i}_{abc}$ are locally averaged values of $v_{abc}$ and $i_{abc}$.

FIG. 2B illustrates bidirectional switch 40. In prior art systems, matrix converters included bidirectional switches implemented using insulated gate bipolar transistors (IGBTs), for example. The use of IGBTs required the use of diodes to properly achieve bidirectional power flow. Bidirectional switch 40, in contrast, uses metal-oxide-semiconductor field-effect transistors (MOSFETs) 42 and 44, which may be silicon carbide (SiC) MOSFETs, for example. MOSFETs are channel devices that do not require the use of external diodes, as the internal channels of the MOSFET accomplish this task. Thus, bidirectional switch 40 may be accomplished by connecting the drains of MOSFETs 42 and 44. By using MOSFETs, the conduction loss of the bidirectional switch may be reduced.

Figure 2C:
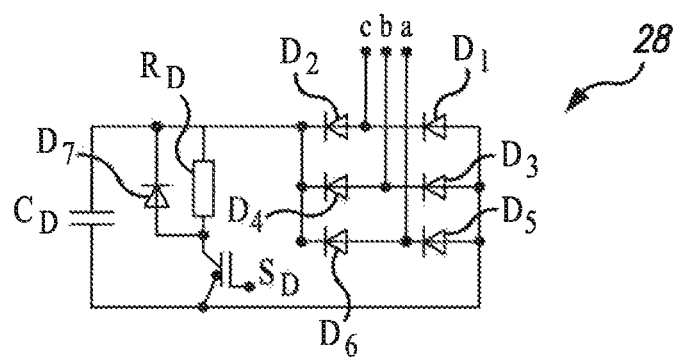

FIG. 2C illustrates an embodiment of damp circuit 28. As seen in FIG. 1, and in contrast to a matrix converter system that operates in VCM mode, damp circuit 28 is only connected to the input side of matrix converter 22. This is due to the absence of an LC circuit, in particular inductors of the LC circuit, provided at the input side of the matrix converter 22. Damp circuit 28 is configured such that if there is a disruption of current flow, the energy stored in the internal inductances of generator 24 has a path. Damp circuit 28 includes diodes D1-D7, capacitor $C_D$, resistor $R_D$, and switch $S_D$. Diodes D1-D6 form a rectifier circuit. The energy stored in the internal inductances of generator 24 upon shutdown of matrix converter 22, for example, flows through the rectifier circuit and charges capacitor $C_D$. Switch $S_D$ may then be controlled to discharge capacitor $C_D$ through resistor $R_D$.

Figure 3A:
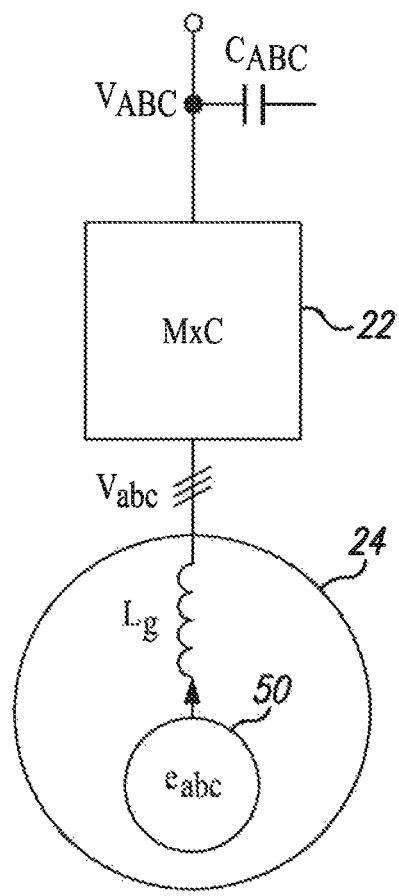
FIG. 3A is a line diagram illustrating a back electromotive force (EMF) of an example generator connected to an input of a matrix converter in accordance with embodiments of the disclosure.
Figure 3B:
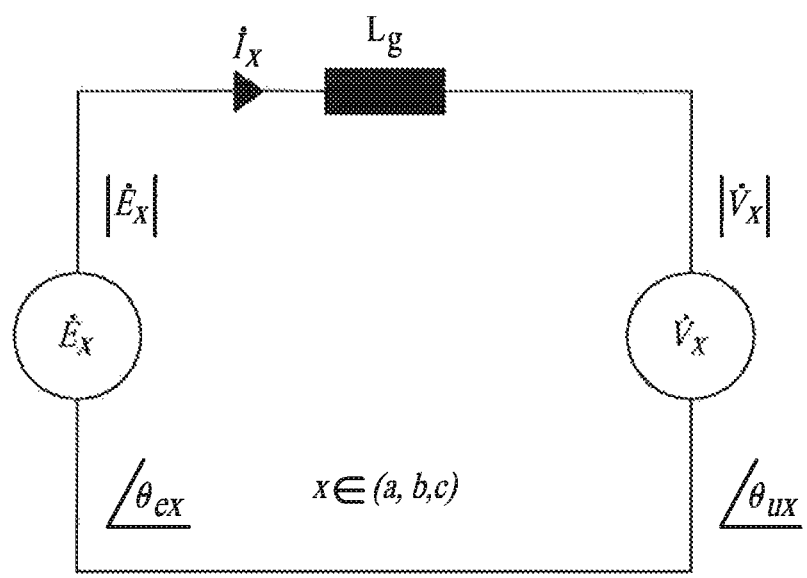
FIG. 3B is a line diagram illustrating a balance between the back EMF of a generator and an input voltage of an example matrix converter system in accordance with embodiments of the disclosure.
Figure 3C:
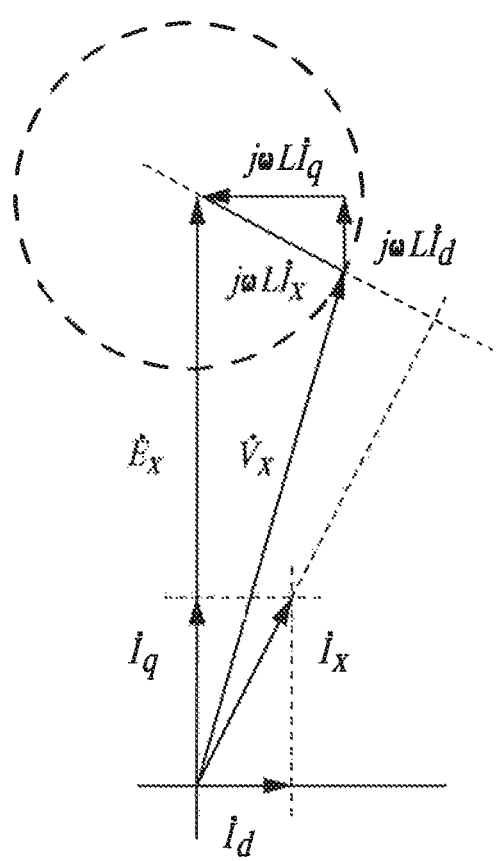
FIG. 3C is a phasor diagram illustrating vectors for back EMF voltage of an example generator, the voltage at the input to a matrix converter, and active and reactive currents from the generator in accordance with embodiments of the disclosure.

FIGS. 3A-3C are diagrams illustrating voltage and current relationships within system 10. FIG. 3A is a line diagram illustrating a back EMF 50 of generator 24 connected to the input of matrix converter 22. FIG. 3B is a line diagram illustrating a balance between the back EMF voltage $E_x$ of generator 24 and input voltage $V_x$ to matrix converter 22. FIG. 3C is a phasor diagram illustrating vectors for back EMF voltage $\dot{E}_x$ of a generator, the voltage $\dot{V}_x$ at the input to a matrix converter, and active $\dot{I}_q$ and reactive $\dot{I}_d$ currents from generator 24. FIGS. 3A-3C will be discussed together.

Generator 24 produces back EMF 50 ($e_{abc}$) and has internal inductances $L_G$. In accordance with the notation used with a subscript having multiple letters, a signal or component corresponds to each letter. Voltage ($v_{abc}$) at the output of generator 24 is provided to matrix converter 22. The voltage across capacitors $C_{ABC}$ ($V_{ABC}$) is the output voltage of matrix converter 22. For CCM, controller 26 operates to control input voltage ($v_{abc}$) to control current through matrix converter 22. This relationship is seen in FIG. 3B. $\dot{E}_x$ designates the voltage vector for the voltage of back EMF 50 ($e_{abc}$). $\dot{V}_x$ designates the voltage vector for the input voltage ($v_{abc}$) to matrix converter 22. $\dot{I}_x$ designates the current vector for current flowing through internal inductances $L_g$. Thus, to control current flow in input phases (a, b, c), controller 26 may control the input voltage ($v_{abc}$). For example, if the input voltage vector $\dot{V}_x$ is equal to the back EMF vector $\dot{E}_x$, no current will be flowing to the input of matrix converter 22.

FIG. 3C is a phasor diagram illustrating the relationship of the back EMF voltage ($e_{abc}$) and the input voltage ($v_{abc}$). FIG. 3C includes phasors $\dot{E}_x$, $\dot{V}_x$, and $\dot{I}_x$. $\dot{I}_x$ is the product of the active current phasor $\dot{I}_q$ and the reactive current phasor $\dot{I}_d$, which are 90° out of phase. The active current phasor $\dot{I}_q$ is in phase with the back EMF voltage $\dot{E}_x$. The voltage drop across the internal inductance $L_g$ ($j\omega L \dot{I}_x$) balances the input voltage $\dot{V}_x$ with the back EMF voltage $\dot{E}_x$. The voltage drop across inductor $L_G$ ($j\omega L\dot{I}x$) is the result of the voltage drop due to the active current ($j\omega L\dot{I}_q$) and due to the reactive current ($j\omega L\dot{I}_d$). Thus, as can be seen in FIGS. 3B and 3C, $\dot{V}_x$ can be controlled to control the current $\dot{I}_x$ to matrix converter 22. As seen in FIG. 3A, $v_{abc}$ can be controlled, in part, by controlling switch matrix 22 to connect $v_{ABC}$ on the output phases (A, B, C) to the input phases (a, b, c).

Figure 4:
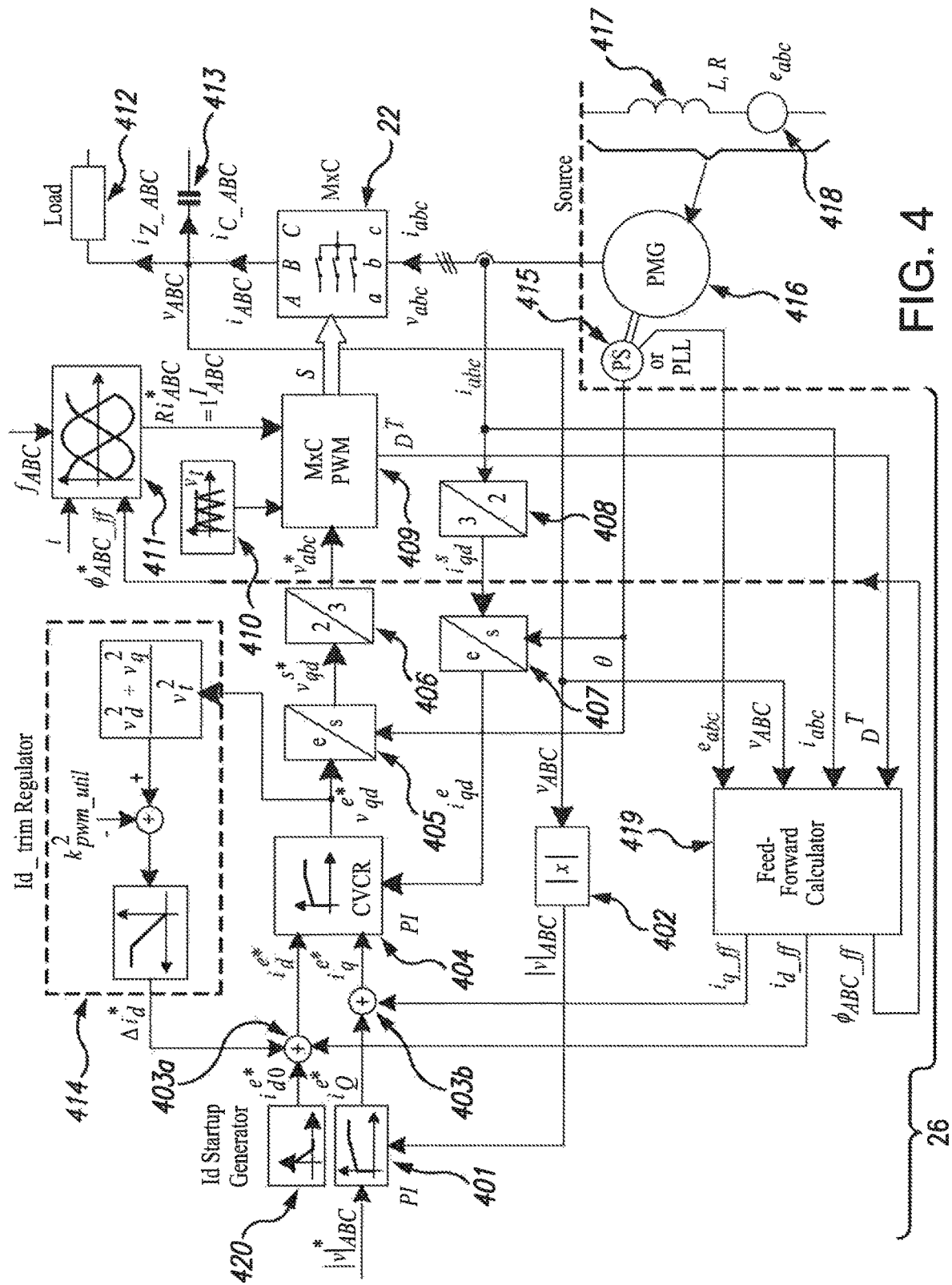
FIG. 4 is a block diagram illustrating an example controller for controlling a matrix converter using a current control mode in accordance with embodiments of the disclosure.

FIG. 4 is a block diagram illustrating at least a portion of controller 26 for controlling matrix converter 22 using CCM in accordance with certain embodiments of controller 26. A generator 416 generates power that is provided to a load 412 via matrix converter 22. The load 412 can be unknown and/or variable. Control of matrix converter 22 by controller 26 is improved when alignment between vABC and iABC is maintained. With vABC and iABC aligned, voltage vector vabc can have the largest amplitude. Those skilled in the art will recognize that vabc is proportional to a modulation index of MxC 22, amplitude of vABC, and a phase angle between vABC and iABC, and thus when vectors vABC and iABC are aligned, a vector having a maximized (e.g., largest possible) unity power factor offers the largest control action for controlling generator current. The switches (SaA-ScC) of matrix converter 22 are further controlled based on a reference voltage v*ABC provided to the matrix converter 22 as a reference voltage for vABC to create and remove short-circuit paths within matrix converter 22. v*ABC can be internally generated, e.g., in an internal microprocessor or provided by an external system that controls MxC 22 as a subsystem.

The feed forward calculator 419 estimates feed forward current and feed forward load angle, which assist to control a saturation level of PWM controller 409 for operation of the switch matrix of matrix converter 22. Saturation of the PWM controller 409 can occur when the output voltage ($v_{ABC}$) has become small compared to the input voltage ($v_{abc}$) due to an inability of the PWM algorithm to control the input voltage ($v_{abc}$) using the small output voltage ($v_{ABC}$). Saturation can be mitigated by controlling matrix converter 22 to generate some reactive current in generator 416 to reduce the demand on the voltage $v_{abc}$ to minimize the possibility of saturation, including to pull the PWM algorithm out of saturation, in other words to avoid saturation during PWM control.

Generator 416 provides an input voltage $v_{abc}$ to matrix converter 22. Generator 416, such as a permanent magnet generator (PMG), is a multiphase generator that includes internal inductances 417 of windings of generator 416. Generator 16 is similar in function and structure to generator 24 of FIG. 1. Generator 16 generates back EMF voltage $e_{abc}$ in its windings. The output of the matrix converter is provided to a three phase balanced load 412. The output voltage $v_{ABC}$ provided to the load 412 can be measured for each phase across capacitors 413, wherein capacitors 413 filter output voltage $v_{ABC}$.

Controller 26 includes a PWM controller 409, a complex vector current regulator (CVCR) 404, a magnitude calculator 402, a unity current reference vector generator 411, a feed-forward calculator 419, an Id startup generator 420, a voltage regulator 401, current sensors 422, a 3:2 transform circuit 408, an observer 415, rotators 405 and 407, an Id_trim regulator 414, an active adder 421, a reactive adder 403, a triangle waveform generator 410, and a 2:3 transform circuit 406.

PWM controller 409 outputs control signals generated using pulse modulation to control switches $S_{aA}$-$S_{cC}$ (for $S_{ij}$, i=a-c and j-A-C, as shown in FIGS. 2-3C) of matrix converter 22. PWM controller 409 implements a matrix converter PWM algorithm such as, for example, space-vector control with triangle comparison, or any other PWM algorithm for matrix converter 22. An example PWM controller is described in U.S. Pat. No. 8,259,474 to Vladimir Blasko, published Feb. 24, 2011.

Feed forward calculator 419 receives output voltage $V_{ABC}$, back EMF $e_{abc}$, sensed current $i_{abc}$, and the matrix converter's 22 $D^T$, and outputs feed forward phase angle and feed forward q and d current components $i^{e*}_{qd\_ff}$.

In the example shown, the PWM controller 409 receives a triangle waveform from triangle waveform generator 410 and a unity current reference vector $1^I_{ABC}$ from unity current reference vector generator 411 for implementing space-vector control with triangle comparison. The unity current reference vector generator 411 receives the feed forward phase angle $\Theta_{ABC\_ff}$. The unity current reference vector generated by unity current reference vector generator 411 defines the position of current phasor/vector $\dot{I}_{ABC}$ that is corrected by the feed forward phase angle $\Theta_{ABC\_ff}$ to adjust a vector $\dot{V}_{ABC}$ representing the output voltage to have a desired position/angle to be aligned with the Q axis (see FIG. 6). The corrected unity current reference vector ($\dot{I}_{ABC}$) that is provided to the matrix converter 22 thus adjusts output voltage position based upon the feed forward phase angle $\theta_{ABC\_ff}$. The feed forward phase angle $\Theta_{ABC\_ff}$ is used to adjust the vector representing the output voltage $\dot{V}_{ABC}$ to be aligned with the unity voltage reference vector $1^V_{ABC}$ in the presence of load 412, even when the load 412 is unknown and/or is changing.

The feed forward q and d current components $i_{qd\_ff}$ (also referred to as $i_{q\_ff}$ and $i_{d\_ff}$) are provided, respectively, to active adder 403b and reactive adder 403a, which each apply a function to the respective and feed forward q and d current components $i_{qd\_ff}$. As described below, output of the respective active and reactive adders 403b and 403a are provided as active and reactive current reference signals $i^{e*}_q$ and $i^{e*}_d$ to the CVCR 404. The active and reactive current reference signals $i^{e*}_q$ and $i^{e*}_d$ are configured to control power transfer from low voltage (denoted abc) to high voltage (denoted ABC), also referred to as low and high sides, respectively.

With reference to generation of the reactive current reference $i_d^{e*}$ that is provided to the CVCR 40, $\dot{I}_d$ startup generator 420 operates during startup time when the output voltage $v_{ABC}$ is still forming and has an amplitude significantly below reference value to generate an initial reactive current reference $i^{e*}_{d0}$. Id startup generator 420 increases or initializes the initial reactive current reference $i^{e*}_{d0}$ at startup, e.g., as 1 to 1 per unit (pu) value, for a predetermined time interval that is a fraction of a period of the output voltage waveform. Then Id startup generator 420 gradually ramps down the initial reactive current reference $i^{e*}_{d0}$, e.g., to zero, after the predetermined time interval. The ramp down can occur, for example, over a 5 to 10 ms time span.

At light load or no load, there is a need for substantial reactive id current to have regulators operational and the PWM controller 409 in a non-saturated region. Once after startup when a grid is formed or there is a weak grid or parallel unit running and able to provide loading or reactive power for a capacitor bank (i.e., a small capacitor bank having three capacitors) at the output, the matrix converter 22 becomes fully controllable.

The initial reactive current reference $i^{e*}_{d0}$ output by the Id startup generator 420 is combined at reactive adder 403a with feed forward d current component $i^e_{d\_ff}$ from the feed forward circuit 419 and $\Delta i^e_d$ output from Id_trim regulator 414, wherein Id_trim regulator 414 is described further below. The output of the reactive adder 403a is the reactive current reference $i^{e*}_d$, which is provided to the CVCR 404.

With reference to generation of the active current reference $i^{e*}_q$ that is provided to the CVCR 404, voltage regulator 401 creates a regulated active current signal $i^{e*}_Q$. Voltage regulator 401 is a proportional integral (PI) output voltage magnitude regulator that uses a PI method to regulate magnitude of the output voltage. As is known to those having skill in the art, PI regulators consist of a proportional part and an integral part. The proportional part multiplies error signal with a proportional gain. The integral part integrates an error input signal with an integral gain. Due to integral action, the PI regulator eliminates steady state DC error from the input signal.

It is noted that in phasor notation active power brought to ABC from abc side is proportional to the product of phasor $\dot{E}_{abc}=E_q$ which is phase current $\dot{I}_{abc}=I_g$ in a phasor notation. In vector notation the power transfer is a product of vector components $e_q^e i_q^e$, in synchronous reference frame when aligned with q axis and $e_d^e=0$.

In the example embodiment shown, PWM controller 409 receives a triangle waveform from triangle waveform generator 410 to implement a switching matrix S with switching pulses for turning on and off switches in a power stage of matrix converter 22. Matrix converter 22 can further receive a unity current reference vector from unity current reference vector generator 411, which uses three cosine functions with unity amplitude 120 degrees apart for defining position angle $\Theta_{ABC}$ and frequency $f_{ABC}$ of locally averaged current $i_{ABC}$ at the output of matrix converter 22.

With reference to application of the phase reference angle $\theta_{ABC\_ff}$ in the example embodiment shown, PWM controller 409 receives a triangle waveform from triangle waveform generator 410 to implement a switching matrix S with switching pulses for turning on and off switches in a power stage of matrix converter 22. Matrix converter 22 can further receive a unity current reference vector $1^I$ ABC from unity current reference vector generator 411, which uses three cosine functions with unity amplitude 120 degrees apart for defining position angle $\Theta_{ABC}$ and frequency $f_{ABC}$ of locally averaged current $i_{ABC}\delta\delta$ at the output of matrix converter 22. Locally averaged values of variables, like fast changing current or voltages, are averaged values over short sampling interval that can be considered to be constant over short sampling intervals. The sampling time can be related to a period of switching of devices in a power circuit of a matrix converter. Unity current reference vector generator 411 receives phase reference angle $\Theta_{ABC\_ff}$ and the frequency $f_{ABC}$ of $i_{ABC}$ and applies equations for determining unity current for each phase at a time t as shown in Equations (1):

$$1^I_A = \cos(2\pi f_{ABC}t - 0 - \phi^*_{ABC}) \quad (1)$$

$$1^I_B = \cos\left(2\pi f_{ABC}t - \frac{2\pi}{3} - \phi^*_{ABC}\right)$$

$$1^I_C = \cos\left(2\pi f_{ABC}t - \frac{4\pi}{3} - \phi^*_{ABC}\right)$$

The output voltage ($v_{ABC}$) of matrix converter 22 is sampled by magnitude calculator 402. Magnitude calculator 402 is any analog or digital circuit or device capable of outputting a voltage value (V) indicative of the magnitude of feedback voltage at capacitors $C_A$, $C_B$, and $C_C$. The input voltage ($v_{abc}$) of matrix converter 22 is sampled at the output of generator 416 and provided to observer 415. Current ($i_{abc}$) is sampled by current sensors 422 at the output of generator 416 and provided to observer 415, feed forward calculator 419, and 3:2 transform circuit 408.

Observer 415 is a circuit capable of determining a reference angle θ. The observer 415 can include, for example, a position sensor (e.g., a resolver on a shaft of the generator 416) to determine an angular position ($\theta_{abc}$) of a rotor of generator 416 based upon the sampled voltage ($v_{abc}$) and current ($i_{abc}$), and thus the position of generated voltage e (back EMF) in the generator. In embodiments, observer 415 includes a phase locked loop (PLL) from voltage source $e_{abc}$ if a separate voltage source is used.

3:2 transform circuit 408 performs an abc-to-dq transformation to convert the three-phase AC signal into two-phase AC signal ($i^s_q$ and $i^s_d$). The block 407 performs a rotational transformation on the two-phase AC signal ($i^s_q$ and $i^s_d$), creating from them DC-like signals ($i^e_q$ and $i^e_d$, hereinafter referred to as "static DC signals").

Controller 26 receives a reference voltage vector v*ABC having magnitude $|v|^*_{ABC}$ that represents the amplitude of a desired output voltage ($v_{ABC}$). The output voltage magnitude ($|v|_{ABC}$) is provided to voltage regulator 401. Using the reference input ($v^*_{ABC}$) and the measured voltage magnitude ($|v|_{ABC}$), voltage regulator 401 generates a current signal ($i^e_q$) that is indicative of the difference between the output voltage magnitude ($|v|_{ABC}$) and the reference input ($v^*_{ABC}$). Because active current ($i_q$) is in phase with the back EMF voltage of generator 416, the output of voltage regulator 401 is a regulated active current signal $i^{e*}_Q$. As previously described, the regulated active current signal $i^{e*}_Q$ output by voltage regulator 401 is combined at active adder 403b with feed forward q current component $i_{q\_ff}$ to form active reference current signal $i^{e*}_q$, which is provided to the active current regulator in CVCR 404, which includes active (q) and reactive (d) current regulators.

The output of CVCR 404, components $v_d$ and $v_q$ are introduced into PWM controller 409 through rotator 405, and then through 2:3 transform circuit 406, as a three phase signal voltage reference signal $v^*_{abc}$. The three phase voltage reference signal $v^*_{abc}$ is after zero sequence injection, compared with triangle waveform signal $v_t$ and should not exceed its amplitude in order to avoid PWM saturation. While voltage reference signal $v^*_{abc}$ is transformed from $v^{e*}_{qd}$, the $v^{e*}_{qd}$, signal is input to Id_trim regulator 414, wherein the of the Id_trim regulator 414 s indicative of saturation of the PWM algorithm. Id_trim regulator 414 is configured to output a control signal ($\Delta id^*$) indicative of a desired change in reactive current, wherein ($\Delta id^*$) is used to avoid saturation of the PWM controller 409 by reducing demand on voltage $v_{abc}$ which is proportional to voltage reference signal $v^*_{abc}$ and consequently to $v^{e*}_{qd}$ Reactive adder 403a is used to adjust the reactive current control signal (id$^e$*) based on the desired change in reactive current (Δid*) from Id_trim regulator 414 and feed forward reactive current i$^{e*}_{d\_ff}$. The output of reactive adder 403a is provided to CVCR 404. Active adder 403b is used to adjust the regulated active current signal (i$^{e*}_q$) output by voltage regulator 401 based on feed forward active current i$^{e*}_{q\_ff}$. The output of active adder 403b is also provided to CVCR 404.

CVCR 404 includes regulators for regulating active current (i$^e_q$) and reactive current (i$^e_d$), implemented in a synchronous—rotating reference frame received output from rotator 407 using the respective active and reactive current control signals output by active adder 403b and reactive adder 403a. Thus, in embodiments, currents i$^e_q$ and i$^e_d$ can be regulated by separate synchronous reference frame q and d regulators. CVCR 404 can be viewed as an improved version of q and d separate regulators with inherent cross coupling as known to these familiar with theory of operation of CVCR. CVCR regulator 404 generates a voltage indicative of a difference between the regulated active and reactive current feedback (i$^e_q$, i$^e_d$, respectively) and provides the voltage v$^{e*}_{qd}$ to rotator 405.

Rotator 405 receives the two DC like voltages, components v$_d$ and v$_q$, from CVCR 404. Rotator 405 also receives a control angular position (θ$_{abc}$). Controller 26 uses the control angular position (θ$_{abc}$) to control the frequency of the voltage (v$_{abc}$). Rotator 405 converts the two DC like voltages, components v$_d$ and v$_q$, and provides v$_d$ and v$_q$ to 2:3 transform circuit 406. 2:3 transform circuit 406 performs a d$^s$q$^s$-to-abc transformation on the two ac voltages in d$^s$q$^s$ stationary reference frame to generate three-phase signals v$_{abc}$ for PWM controller 409. PWM controller 409 then uses the three-phase signals v$_{abc}$ to control matrix converter 22. The superscript s represents a stationary reference frame, wherein signals in a stationary frame are AC sinusoidal signals and signals in a rotating frame are steady DC-like signals.

Matrix converter system 10 has several advantages over a matrix converter that operates in the VCM mode. By controlling matrix converter system 10 using CCM, the input LC circuit may be removed, and output voltage can be filtered by only additional three capacitors, one per phase. This reduces the size and weight of the matrix converter system. Matrix converter system 10 is also able to operate in a boost mode, allowing voltage operation at the output above 86.6% of the input voltage (the generator's 416 back EMF) which has been a major drawback in previous matrix converter system design.

In operation, CVCR 404, regulates i$^e_q$ and i$^e_d$ current components to follow current references i$^{e*}_q$ and i$^{e*}_d$. Output of CVCR 404 is a voltage vector v$^{e*}_{qd}$, which after transformation into stationary reference frame and into abc coordinates by 2:3 transform circuit 406, becomes v*$_{abc}$. v*$_{abc}$ is a modulation input into PWM controller 409, which creates v$_{abc}$ on a low-voltage side from available voltage on high-voltage side, namely v$_{ABC}$ cos Θ$_{ABC}$. Thus voltage v$_{abc}$ is proportional to the modulation voltage v*$_{abc}$ and v$_{ABC}$ COS Θ$_{ABC}$. Thus, the load power factor has an impact on available voltage and control of source current on the low-voltage side.

Operation with feed forward q and d current components i$^{e*}_{q\_ff}$ and identification of a load angle δ is now described. Feed forward values of I$_q$ and I$_d$ current are calculated based on power demand at output of matrix controller 22 and also based on a need for reactive I$_d$ current component to provide an amount of voltage to still maintain PWM controller 409 below saturation level, having modulation index m<1. Modulation index is the ratio between amplitude of voltage reference signal v*$_{abc}$ and peak value of triangle waveform from block 410.

Figure 5:
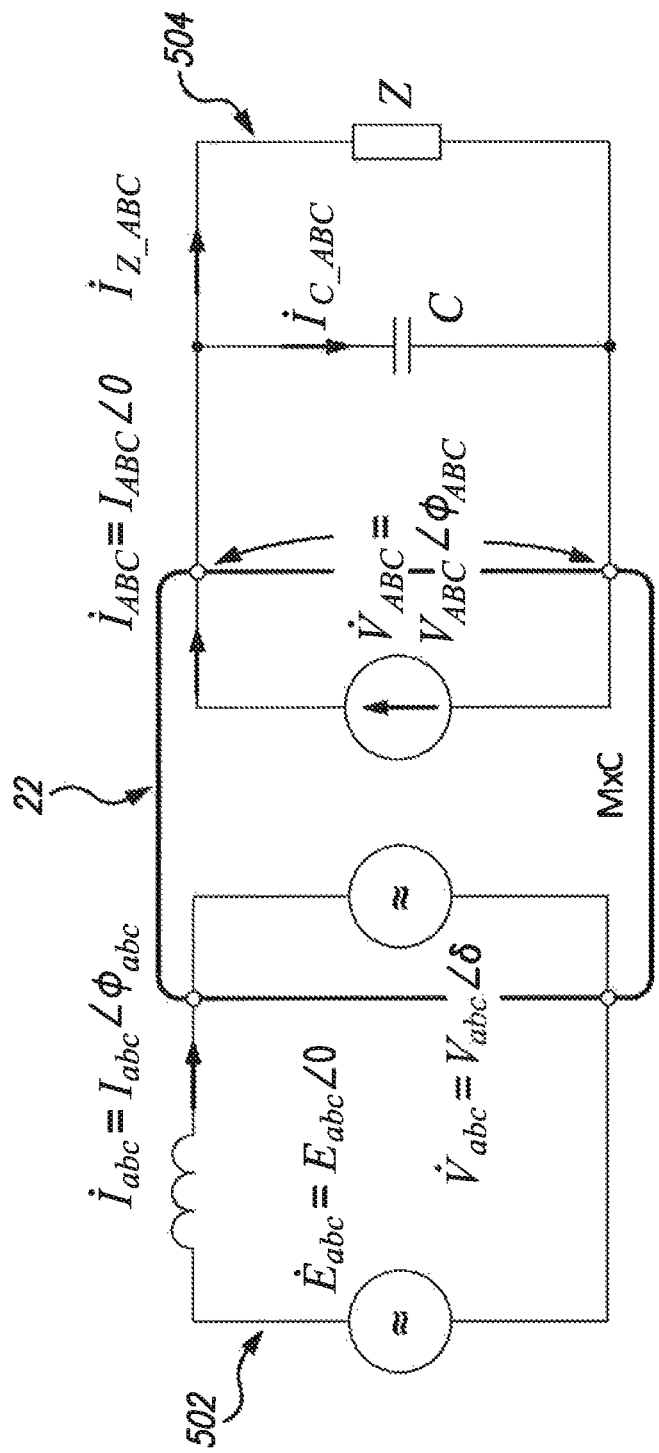
FIG. 5 is a diagram of an equivalent circuit of an example matrix converter in accordance with embodiments of the disclosure.
Figure 6:
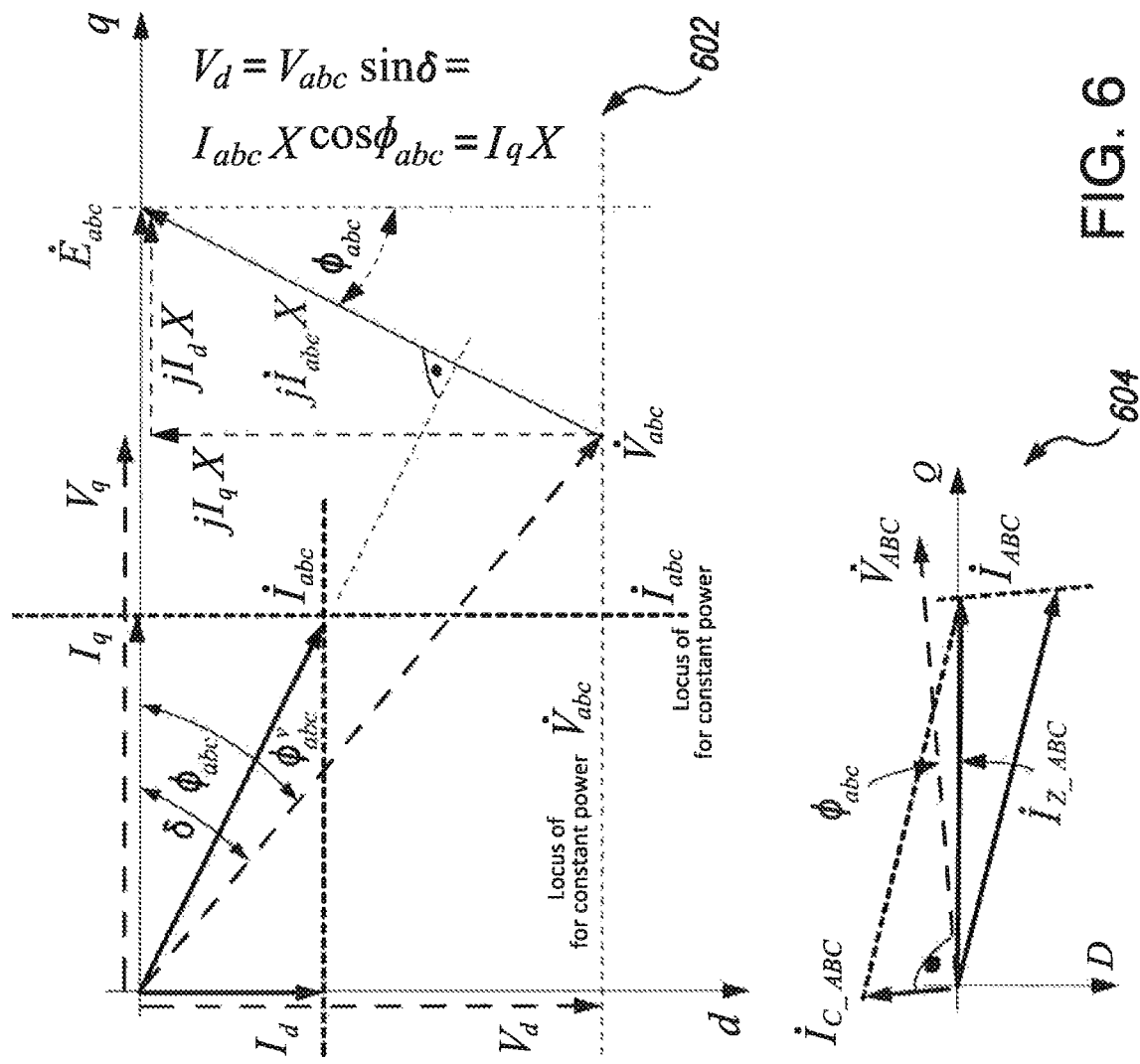
FIG. 6 is a phasor diagram of low and high-voltage sides of the matrix converter of FIG. 5.

With reference to FIGS. 5 and 6, FIG. 5 shows an equivalent circuit of the matrix converter 22 with a positive direction of power flow defined to be from low-voltage abc side 502 to high-voltage ABC side 504. FIG. 6 shows a phasor diagram of the low-voltage side in plot 602 and the high-voltage side in plot 604 of the matrix converter 22. Phasors are defined with their amplitudes and phase angle in a complex plane captured at a specific moment in the time. Phasor notation is indicated by a dot above a capital letter. Magnitude of the phasor is indicated by usage of the capital letter without the dot.

Equations to be used for feed forward calculations are provided in Equations (1)-(14). Equation (1) describes an example calculation of the amplitude of a phasor representing back EMF of the source, e.g., generator 416:

$$E_{abc} = |\dot{E}_{abc}| = \sqrt{\frac{2}{3}(e_a^2 + e_b^2 + e_c^2)} \quad (1)$$

Equations (2)-(4) describe example calculations of active P, reactive Q and apparent power S, respectively:

$$P = \frac{2}{3}(v_A i_A + v_B i_B + v_C i_C) \quad (2)$$

$$Q = \frac{2}{3\sqrt{3}}[(v_B - v_C)i_A + (v_C - v_A)i_B + (v_A - v_B)i_C] \quad (3)$$

$$S = \sqrt{P^2 + Q^2} \quad (4)$$

Equations (5) describe example calculations for a load angle on the high-voltage side 504:

$$\phi_{ABC} = \text{atan}\left(\frac{Q}{P}\right); \text{ and } \cos(\phi_{ABC}) = \frac{P}{S}; \sin(\phi_{ABC}) = \frac{Q}{S} \quad (5)$$

Equation (6) describes an example calculation of the output voltage (determined similarly to E$_{abc}$ in Equation (1)):

$$V_{ABC} = |\dot{V}_{ABC}| = \sqrt{\frac{2}{3}(v_A^2 + v_B^2 + v_C^2)} \quad (6)$$

In Equations (1)-(6), it was adopted that amplitude of each phasor was equal to the peak value of sinusoidal voltage from the voltage source, e.g., generator 416. Typical convention for phasors uses the root mean square (RMS) value of sinusoidal waveforms, which is √2 times smaller than peak value. In this method, the reasons for using peak values for the phasors is to provide compatibility of Equations (1)-(6) with vector control applied in other equations, since vector control is based on peak values.

The matrix converter 22 having a sinusoidal balanced three—phase system with voltage transfer from the high-voltage side 504 to the low-voltage side 502 is governed by Equation (7):

$$V_{abc} = m\frac{\sqrt{3}}{2} V_{ABC} \cos\phi_{ABC}, \quad (7)$$

where m is a modulation index (0≤m≤1). Current transfer from the low-voltage side 502 to the high-voltage side 504 is governed by Equation (8):

$$I_{ABC} = I_{abc} m \frac{\sqrt{3}}{2} \cos\phi_{abc}^v = \frac{E_{abc} I_{abc} \cos\phi_{abc}}{V_{ABC} \cos\phi_{ABC}} \quad (8)$$

$$= \frac{E_{abc}}{X} m \frac{\sqrt{3}}{2} \sin\delta = I_{abc}^{sc} m \frac{\sqrt{3}}{2} \sin\delta,$$

where δ is a load angle (angle between phasors $\dot{E}_{abc}$ and $\dot{V}_{abc}$) and superscript v represents subscript in cos $\phi_v$, as can be seen in FIG. 6.

Equation (9) describes example calculations for determining the current $I_{abc}$ on the low side 502:

$$\dot{E}_{abc} = \vec{E}_{qd} = E_q - jE_d, \quad (9)$$

$$\dot{V}_{abc} = \vec{V}_{qd} = V_q - jV_d,$$

$$X = \omega L$$

$$\dot{I}_{abc} = I_q - jI_d = \frac{\dot{E}_{abc} - \dot{V}_{abc}}{jX}$$

Equations (10) describe example calculations of active and reactive current components along the q and d axes:

$$I_q = \frac{V_d - E_d}{X}; \quad I_d = \frac{E_q - V_q}{X} \quad (10)$$

and amplitude $$I_{abc} = \sqrt{I_q^2 + I_d^2}$$

Equations (11) describes power delivered from low-voltage side 502 to high-voltage side 504 for $$\dot{E}_{abc} = E_q: \quad (11)$$

$$P = \frac{3}{2} E_{abc} I_q,$$

and with $$E_q = E_{abc}, \quad E_d = 0$$

$$V_q = V_{abc} \cos\delta, \quad V_d = V_{abc} \sin\delta,$$

and using Equations (10) for currents introduced into Equations (11) for power, the power delivered from low-voltage side 502 to high-voltage side 504 is described by Equation (12):

$$P = \frac{3}{2} E_q I_q = \frac{3}{2} \frac{E_{abc} V_d}{X} = \frac{3}{2} \frac{E_{abc} V_{abc} \sin\delta}{X} \quad (12)$$

Equation (13) results from introducing Equation (7) into Equation (12):

$$P = \frac{E_{abc} m \frac{\sqrt{3}}{2} V_{ABC} \cos\phi_{ABC}}{X} \sin\delta. \quad (13)$$

From Equation (13), it is visible that output power P is proportional to the sine of load angle δ and modulation index m. For maximum power transfer m=1. Equation (14) is used for determining an optimal load angle with m close to unity, thus for m=1 it follows from equation (13):

$$\sin\delta = \frac{P}{\frac{E_{abc}}{X} \frac{\sqrt{3}}{2} V_{ABC} \cos\phi_{ABC}}; \quad \cos\delta = \sqrt{1 - (\sin\delta)^2} \quad (14)$$

Figure 7:
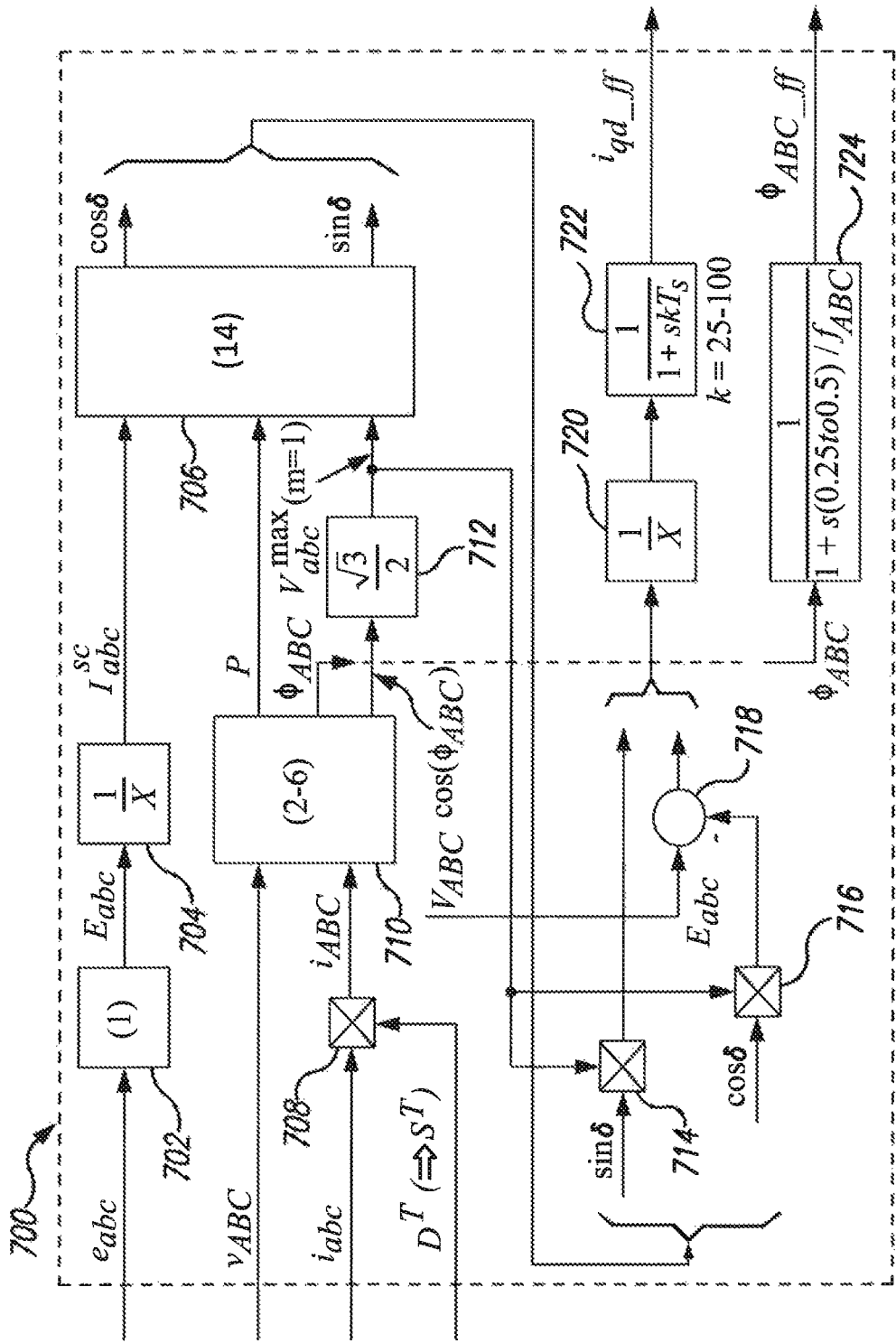
FIG. 7 is a flow diagram of an example method performed by an example controller of a matrix converter of FIG. 4.

FIG. 7 provides a flow diagram 700 that shows an example method of performance of generating feed forward references for reactive and active current signals $i_d$ and $i_q$ currents is shown and deriving angle $\Phi_{abc\_ff}$ between output voltage and current that is used adjust the position of output current $i_{ABC}$ to cause voltage vector $v_{ABC}$ to be positioned at a desired location.

At operation 702 Equation (1) is performed to generate $E_{abc}$ which is provided to function 1/X at block 704. The output of block 704, $I^{SC}_{abc}$, where the superscript SC indicates "short circuit", is provided to block 706. At operation 708, a function (e.g., multiplier function) is applied to $i_{abc}$ and $D^T \rightarrow S^T$, and the output $i_{ABC}$ is provided to operation 710. Operation 710 further receives feedback signal $V_{ABC}$. At operation 710, Equations (2)-(6) are performed on the inputs. The outputs of Equations (2)-(6) are provided to operation 706 and operation 724. At operation 706 equation 14 is performed and sine and cosine values of load angle δ are input to operations 714 and 716, respectively. The output of operations 716 and 702 are provided to operation 718 to operation 714 which performs a function on these two output values. The output of operations 714 and 720 are provided to operations 720.

At operation 720, a function 1/X is applied and the output is provided to operation 722. At operation 722, an operation 1/(1+skT$_s$) is applied to the output of operation 720, wherein k=25-200 in the example shown, and feed forward active and reactive currents $i_{qd\_ff}$ are output. Operation 722, namely 1/(1+skT$_s$), includes application of a filter that causes a delay in the generation of the feed forward active and reactive currents $i_{qd\_ff}$. At operation 724, a function is applied to $\phi_{ABC}$ received from operation 710 and $\phi_{ABC\_ff}$ is output. The function applied at operation 724 includes application of a filter that causes a delay in the generation of the feed forward output phase angle $\theta_{ABC\_ff}$.

Figure 8:
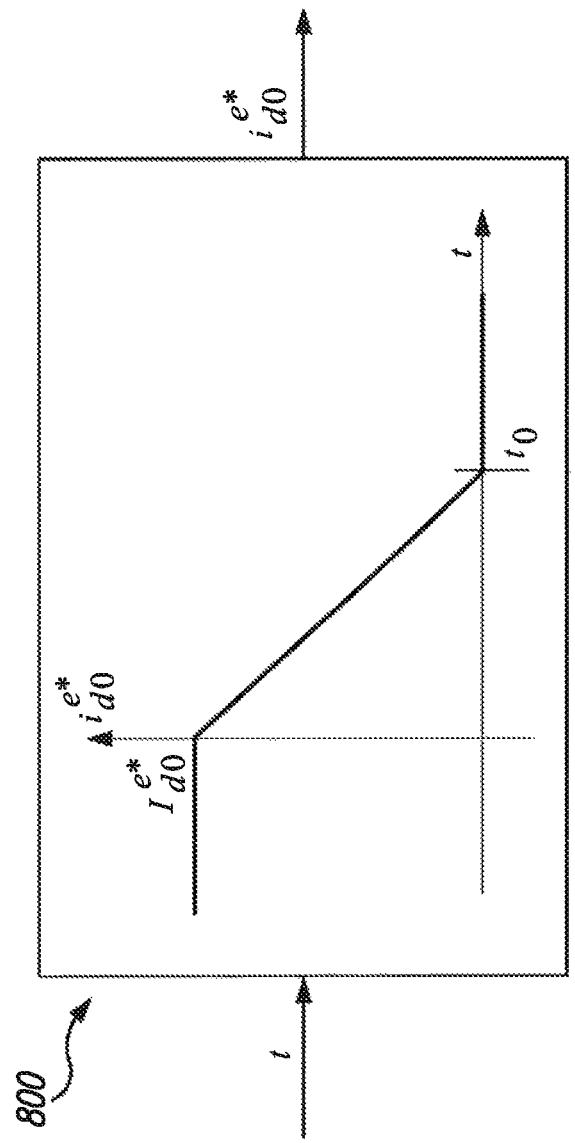
FIG. 8 is a graph of an example plot of an input reactive current provided by an ID startup generator of FIG. 4.

FIG. 8 shows an operation 800 performed by $\dot{I}_d$ startup generator 420 in which, based on the passage of time, for a predetermined first time interval, current reference $i^{e*}_{d0}$ is set to a selected value, after which the value of current reference $i^{e*}_{d0}$ is ramped down to about zero over a second predetermined time interval ending at time $t_0$.

Figure 9:
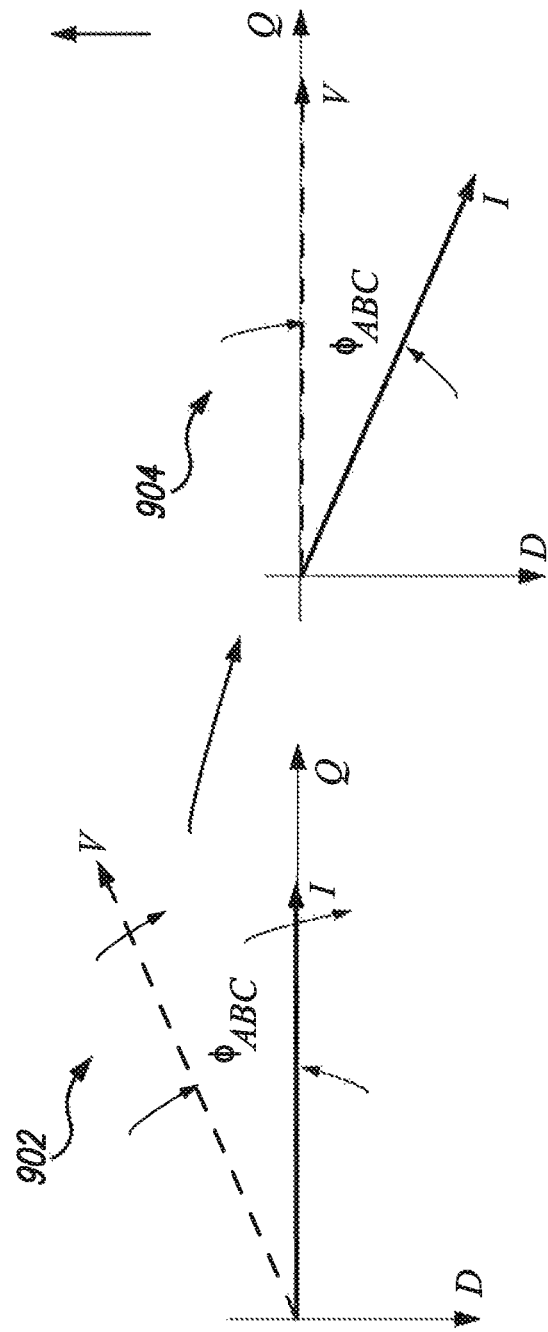
FIG. 9 are phasor diagrams of showing correction of a current phasor/vector in accordance with embodiments of the disclosure.

At FIG. 9, a block diagram showing application of the feed forward phase angle $\Phi_{ABC\_ff}$ is shown. Unity current reference vector generator 411 receives $\Phi_{ABC\_ff}$ and the frequency of $f_{ABC}$ of $i_{ABC}$ and applies equations for determining unity voltage for each phase at a time t as shown in Equations (15):

$$1_A^V = \cos(2\pi f_{ABC}t - 0 - \phi_{ABC\_ff})$$

$$1_B^V = \cos\left(2\pi f_{ABC}t - \frac{2\pi}{3} - \phi_{ABC\_ff}\right)$$ (15)

$$1_C^V = \cos\left(2\pi f_{ABC}t - \frac{4\pi}{3} - \phi_{ABC\_ff}\right)$$

Plots 902 and 904 show how the position of current phasor/vector $\dot{I}_{ABC}$ is adjusted by estimated angle $\Phi_{ABC\_ff}$ to keep the voltage phasor/vector at a selected position to be aligned with the Q axis.

Figure 10:
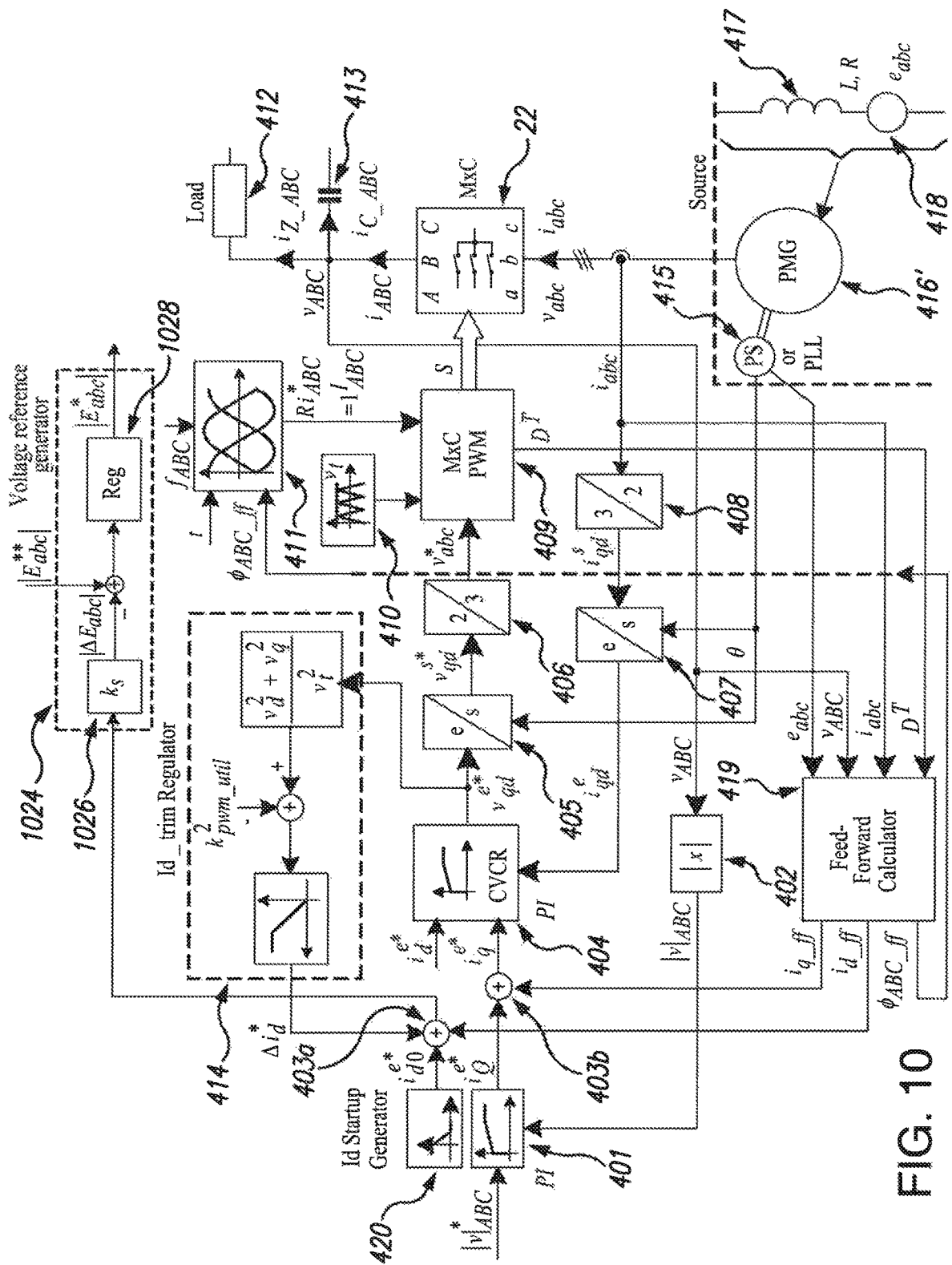
FIG. 10 is a block diagram illustrating an example voltage reference generator and an example controller for controlling a matrix converter using a current control mode in accordance with embodiments of the disclosure and FIG. 11 is a block diagram of an exemplary computer system configured to implement components of a controller of the matrix converter system of FIG. 1.

With reference to FIG. 10, a voltage reference generator 1024 and a generator 416' configured to have controllable back EMF are provided. Control of the back EMF of generator 416' can be performed using an induction motor or generator. For example, the back EMF can be controlled through rotor flux vector control. The voltage reference generator 1024 generates a reference signal $|E*_{abc}|$ that is used to control generator 416 for adjusting the back EMF.

A scaling circuit 1026 receives an input signal from the output from reactive adder 403, which is a function of the feed forward reactive current $i_{d\_ff}$, current reference $i^{e*}_{d0}$, and desired change in reactive current $\Delta id*$ from Id_trim regulator 414. A scaling function is applied to relate the input signal to a desired voltage change, namely a target back EMF value $|E_{abc}|$ that is input to the voltage reference generator 1024. A regulator 1028 performs a regulator function on the output of the scaling circuit 1026** and outputs the reference signal $|E*_{abc}|$. Reference signal $|E_{abc}|$ functions as a control signal to control the source voltage from the generator 416 and/or the back EMF from the generator 416.

When generator voltage is controlled by the controller 26, CVCR 404 does not receive the output from reactive adder 403, and rather receives $id^{e*}$, which can be kept close to zero or equal to zero. In this way, total current load of the source/controllable generator is kept to a minimum with minimal losses occurring in the generator 416 and matrix converter 22. This change in input to CVCR 404 relative to the embodiment shown in FIG. 4 is due to using regulation of the back EMF of generator 416' to keep PWM out of saturation, such application of feed forward reactive current $i_{d\_ff}$ and/or desired change in reactive current $\Delta id*$ from Id_trim regulator 414 to CVCR 404 is not necessary for controlling saturation of PWM controller 409.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 11:
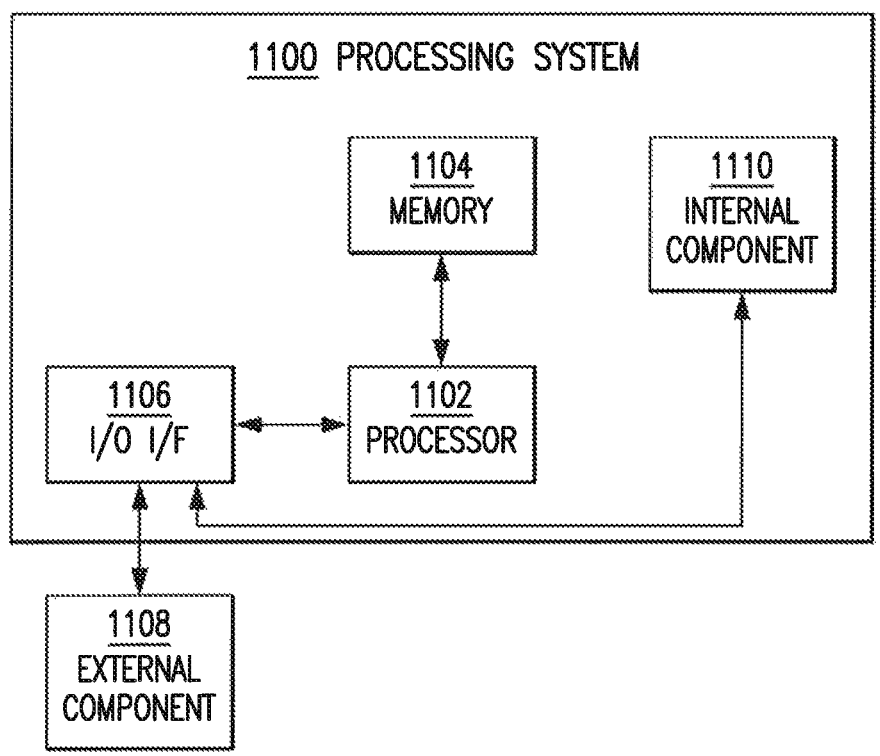

With reference to FIG. 11, a block diagram of an example computing system 1100 is shown, which provides an example configuration of the controller 26 or one or more portions of the controller 26. Computing system 1100 is only one example of a suitable system and is not intended to suggest any limitation as to the scope of use or functionality of embodiments of the disclosure described herein. Computing system 1100 can be implemented using hardware, software, and/or firmware. Regardless, computing system 1100 is capable of being implemented and/or performing functionality as set forth in the disclosure.

Computing system 1100 is shown in the form of a general-purpose computing device. Computing system 1100 includes a processing device 1102, memory 1104, an input/output (I/O) interface (I/F) 1106 that can communicate with an internal component 1110, and optionally an external component 1108.

The processing device 1102 can include, for example, a programmable logic device (PLOD), microprocessor, digital signal processor (DSP), a microcontroller, a field programmable gate array (FPGA), an application specific integrated circuit (ASCI), and/or other discrete or integrated logic circuitry having similar processing capabilities.

The processing device 1102 and the memory 1104 can be included in components provided in the FPGA, ASCI, microcontroller, or microprocessor, for example. Memory 1104 can include, for example, volatile and non-volatile memory for storing data temporarily or long term, and for storing programmable instructions executable by the processing device 1102. I/O I/F 1106 can include an interface and/or conductors to couple to the one or more internal components 1108 and/or external components 1110.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the controller 26 may be implemented or executed by one or more computer systems, such as a microprocessor. Each computer system 1100 can implement controller 26, or multiple instances thereof. In various embodiments, computer system 1100 may include one or more of a microprocessor, an FPGA, application specific integrated circuit (ASCI), microcontroller. The computer system 1100 can be provided as an embedded device. All or portions of the computer system 1100 can be provided externally, such by way of a mobile computing device, a smart phone, a desktop computer, a laptop, or the like.

Computer system 1100 is only one example of a suitable system and is not intended to suggest any limitation as to the scope of use or functionality of embodiments of the disclosure described herein. Regardless, computer system 1100 is capable of being implemented and/or performing any of the functionality set forth hereinabove.

Computer system 1100 may be described in the general context of computer system-executable instructions, such as program modules, being executed by a computer system.

Generally, program modules may include routines, programs, objects, components, logic, data structures, and so on that perform particular tasks or implement particular abstract data types.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A matrix converter system having a current control mode operation comprising:
    a matrix converter having a switching matrix, wherein the matrix converter is coupled at its low-voltage side to a generator and at its output load side to a load;
    a controller having a pulse width modulation (PWM) controller configured to control the matrix converter via its switching matrix to increase energy within internal inductances of the generator when the switching matrix causes a short circuit; and
    a feed forward calculator configured to calculate a feed forward output phase angle, the feed forward output phase angle being an estimation of an angle between an output current vector and an output voltage vector that represent feedback signals of current and voltage output by the matrix converter; wherein the angular position of the voltage output vector is adjusted as a function of the feed forward output phase angle to align angular position or phase angle of the voltage output vector that represents the voltage output with a selected angular position or phase angle.

2. The system of claim 1, wherein the feed forward calculator is further configured to calculate feed forward values of active and reactive currents with respect to back electromotive frequency (EMF) of the generator, the feed forward values of the active and reactive current being calculated based on power demand at the output of the matrix converter, wherein the feed forward values of the active and reactive current are used to adjust currents that affect the controller to minimize the possibility of saturation of the PWM controller.

3. The system of claim 2, wherein calculation of the feed forward active and reactive currents at the position with respect to the back EMF of the generator is a function of magnitude and phase angle position of an EMF vector that represents the back EMF of the generator.

4. The system of claim 2, wherein the feed forward calculator is further configured to apply a filter to generate the feed forward active and reactive currents.

5. The system of claim 2, further comprising:
    a startup generator configured to provide an amount of startup reactive current during a startup phase of the generator,
    wherein the control circuit is configured to receive the startup reactive current and provide an amount of voltage as a function of the startup reactive current to the controller during the startup phase, the amount of voltage being sufficient to avoid saturation of the PWM controller.

6. The system of claim 5, wherein the startup reactive current is maintained for a first interval of time and is ramped down to about zero over a second interval of time interval.

7. The system of claim 1, further comprising a plurality of output capacitors connected to phases of the current output by the matrix converter, wherein the controller is further configured to control the matrix converter to increase the energy in the internal inductance of the generator sufficient, wherein the increase in energy to cause current from the generator to charge the output capacitors.

8. The system of claim 1, wherein the feed forward output phase angle is provided to a unity current reference vector function that implements space-vector control to generate a unity reference current vector having a position defined by the feed forward output phase angle to adjust the angular position of the voltage output by the matrix converter.

9. The system of claim 1, wherein the feed forward calculator is further configured to apply a filter to generate the feed forward output phase angle.

10. A method of controlling operation of a matrix converter operating in a current control mode operation, the matrix converter having a switching matrix, wherein the matrix converter is coupled at its low-voltage side to a generator and at its output load side to a load, the method comprising:
    controlling pulse width modulation (PWM) to control the matrix converter to increase energy within internal inductances of the generator when the a short circuit occurs;
    calculating a feed forward output phase angle, the feed forward output phase angle as an estimation of an angle between an output current vector and an output voltage vector that represent feedback signals of current and voltage output by the matrix converter; and
    adjusting an angular position of the voltage output by the matrix converter as a function of the feed forward output phase angle, the adjusting of the angular position of the voltage output being in order to align angular position or phase angle of the voltage output voltage vector that represents the voltage output with a selected angular position or phase angle.

11. The method of claim 10, further comprising:
    calculating feed forward values of active current and the reactive current at the position with respect to back electromotive frequency (EMF) of the generator, the feed forward values of the active and reactive current being calculated based on power demand at the output of the matrix converter; and using the feed forward values of the active and reactive current from the generator to adjust currents that affect control of the matrix converter to minimize the possibility of saturation during PWM control.

12. The method of claim 11, wherein calculation of the feed forward values of the active and reactive current is a function of back EMF of the generator.

13. The method of claim 10, wherein controlling the matrix converter to increase energy within the internal inductances of the generator when the short circuit occurs, wherein the increase in energy is sufficient to cause current from the generator to charge output capacitors connected to the current output by the matrix converter.

14. The method of claim 11, further comprising:
providing during a startup phase of the generator an amount of startup reactive current;
receiving the startup reactive current; and
providing an amount of voltage as a function of the startup reactive current for controlling the matrix converter during the startup phase, the amount of voltage being sufficient to avoid saturation during PWM control.

15. The method of claim 11, further comprising:
maintaining the startup reactive current for a first interval of time; and
ramping down the startup reactive current to about zero over a second interval of time interval.

16. A matrix converter system having a current control mode operation comprising:
a matrix converter that includes a switching matrix, the matrix converter being coupled at its low-voltage side to a generator and coupled at its output load side to a load;
a controller having a pulse width modulation (PWM) controller configured to control the matrix converter via its switching matrix to increase energy within internal inductances of the generator when a short circuit occurs in the switching matrix; and
a feed forward calculator configured to calculate feed forward values of active and reactive current, the feed forward values of the active and reactive current being calculated based on power demand at the output of the matrix converter, wherein the feed forward values of the active and reactive current are used to adjust currents that affect the controller to minimize the possibility of saturation of the PWM controller.

17. The system of claim 16, wherein the generator has controllable back electromotive frequency (EMF), the system further comprising a voltage reference generator configured to receive an input signal that is a function of the feed forward values and a magnitude of reactive current and to adjust the back EMF of the generator based at least in part on the input signal.

18. The system of claim 17, wherein the voltage reference generator is configured to receive a target back EMF value, determines a voltage change based on a difference between the input signal and the target back EMF value, and is further configured to output a voltage reference to the generator, the voltage reference being based on the voltage change.

19. The system of claim 18, wherein determining the voltage change includes applying a current scaling function to the input signal.

20. The system of claim 16, wherein calculation of the feed forward values of the active and reactive current is a function of back EMF of the generator.

21. The system of claim 13, further comprising a plurality of output capacitors connected to phases of the current output by the matrix converter, wherein the controller is further configured to control the matrix converter to increase the energy in the internal inductance of the generator, wherein the increase in energy is sufficient to cause current from the generator to charge the output capacitors.

22. The system of claim 16, further comprising:
a startup generator configured to provide an amount of startup reactive current during a startup phase of the generator,
wherein the control circuit is configured to receive the startup reactive current and provide an amount of voltage as a function of the startup reactive current to the controller during the startup phase, the amount of voltage being sufficient to avoid saturation of the PWM controller.

23. The system of claim 22, wherein the startup reactive current is maintained for a first interval of time and is ramped down to about zero over a second interval of time interval.

* * * * *